United States Patent [19]
Luke

[11] Patent Number: 5,168,554
[45] Date of Patent: Dec. 1, 1992

[54] CONVERTING TRACE DATA FROM PROCESSORS EXECUTING IN PARALLEL INTO GRAPHICAL FORM

[75] Inventor: Charles A. Luke, Saratoga, Calif.

[73] Assignee: International Business Machines Corporation, Armonk, N.Y.

[21] Appl. No.: 420,845

[22] Filed: Oct. 13, 1989

[51] Int. Cl.⁵ .............................................. G06F 15/40
[52] U.S. Cl. .................... 395/161; 395/155; 395/159; 395/147
[58] Field of Search ........................ 364/518–521, 364/513, 200, 900; 340/721

[56] References Cited

U.S. PATENT DOCUMENTS 4,855,936 8/1989 Casey et al. .................... 364/521
4,953,106 8/1990 Gansner et al. .................... 364/521

OTHER PUBLICATIONS

Ramanathan et al.; A Generic Iconic Tool for Viewing Databases; Sep. 1989.

Primary Examiner—Heather R. Herndon
Assistant Examiner—Almis Jankus
Attorney, Agent, or Firm—R. Bruce Brodie

[57] ABSTRACT

A computer implemented method by which trace data from concurrently executing virtual processors is reformatted and organized as a linked list of successive events evoking parallel activity for any given parallel task. A selective traverse of the links operates to drive time process displays of processor utilization and executing hierarchy of parallel constructs.

6 Claims, 10 Drawing Sheets

PARALLEL PROGRAM EXECUTION HIERARCHY

*Fig. 1* EXAMPLE OF PARALLEL TASK STRUCTURE

*Fig. 2* EXAMPLE OF PARALLEL PROCESSING

Fig. 3
PARALLEL THREAD HIERARCHY

PARALLEL FORTRAN TRACE RECORD ITEMS

31

| TIME STAMP | PROE. NO. | TASK NAME | EVENT TYPE | SOURCE ISN | EVENT STATUS | EVENT DATA (PARENT NAME, CHILD NAME, ETC.) |
|---|---|---|---|---|---|---|
| | | | | | | |
| | | | | | | |

FUNCTIONAL EVENT #1
2

EVENT TYPE =
```
    PARM
    FORK
    INIT
PT  EXEC
PC  CALL
PD  POST
    WAIT
    WONE
    TERM
    STOP
```
-S
-D

EVENT STATUS =
```
FILE
TASK
CASE
WAIT
MORE
POST
CHOP
DONE
```

EVENT DATA =
```
WAIT
LABEL WAIT
LABEL POST PARENT
PARENT TASK NAME
CHILD TASK NAME
CHUNK SIZE, ITERS
NEST LEVEL, PROCS
```

PARALLEL PROCESS TABLE

35

| PARALLEL ACTIVITY TYPE AT START OF PROCESS |
|---|
| ROUTINE & STATEMENT AT START OF PROCESS |
| START TIME OF PROCESS, TIME BETWEEN PROCESSES |
| POINTER TO FIRST TASK AT START OF PROCESS |
| AVERAGE CONCURRENCY, PROCESSOR UTILIZATION |
| NO. TASKS IN PROGRESS |
| PROCESS LAPSED TIME |

PARALLEL ACTIVITY TABLE

33

| TIME VALUE NOTE 1 | PARAL ACTIV NO. NOTE 2 | VIRT PROC NO. | PARAL ACTIV EVENT NOTE 3 | SMT NO. | PARMS OR LABEL NOTE 4 | TASK ID | POINTER TO NEXT EVENT FOR TSK NOTES |
|---|---|---|---|---|---|---|---|
| | | | | | | | |
| | | | | | | | |
| | | | | | | | |

34

FIG. 4  TRACE ANALYSIS TABLE

| RECORD NUMBER | TIME STAMP | VIRT. PROC | PARALLEL THREAD | EVENT NAME | EVENT SPECIFIC INFORMATION ROUTINE ISN | | EVENT DESCRIPTION |
|---|---|---|---|---|---|---|---|
| 7 | 07365289 | 6 | S0000.W0000 | PDFORK | FROM MATMUL.0107 | | PARM 00 06 0001 0001 000180 |
| 8 | 07365290 | 6 | S0000.W0000 | PDFORK | FROM MATMUL.0107 | | TASK S0000.X0001 |
| 9 | 07365292 | 4 | S0000.W0000 | PDFORK | FROM MATMUL.0107 | | TASK S0000.X0002 |
| 10 | 07365293 | 4 | S0000.X0002 | PDINIT | FROM MATMUL.0107 | | |
| 11 | 07365293 | 6 | S0000.X0001 | PDINIT | FROM MATMUL.0107 | | |
| 12 | 08259224 | 4 | S0000.X0002 | PDTERM | FROM MATMUL.0113 | | MORE W0000 |
| 13 | 08265841 | 6 | S0000.X0001 | PDTERM | FROM MATMUL.0113 | | POST W0000 |

*Fig. 5a* RECORDS TRACING THE EXECUTION OF A PARALLEL DO FROM A MAIN PROGRAM

ACTIVITIES TABLE ENTRIES 45 & 46 ARE CREATED FOR PARALLEL DO CONSTRUCT
(TRACE RECORDS 7, 8 & 9)

| ACTIVITY NUMBER | APPL TIME (MICROS) | VP ID | TOTAL VPS | THREAD ACTIVITY ID | COMPL PTR | H# | PARENT PTR T# | PROGRAM NAME | ISN | PU# PAT | LABEL/ DATA |
|---|---|---|---|---|---|---|---|---|---|---|---|
| 45 | 07365289 | 6 | 1 | PD FORK W0000 | 46 | 1 | 0 | MATMUL | 107 | D1 | 1 |
| 46 | 07365289 | 6 | 0 | ID PARM W0000 | | 1 | | | | | 180 |

ACTIVITIES TABLE ENTRIES 47 & 48 ARE CREATED FOR THREAD INITIATION
(TRACE RECORDS 10 & 11)

| ACTIVITY NUMBER | APPL TIME (MICROS) | VP ID | TOTAL VPS | THREAD ACTIVITY ID | COMPL PTR | H# | PARENT PTR T# | PROGRAM NAME | ISN | PU# PAT | LABEL/ DATA |
|---|---|---|---|---|---|---|---|---|---|---|---|
| 47 | 07365293 | 4 | 1 | PD INIT X0002 | ? | 2 | 45 0 | MATMUL | 107 | D1 | |
| 48 | 07365293 | 6 | 2 | PD INIT X0001 | ? | 3 | 45 0 | MATMUL | 107 | D1 | |

*Fig. 5b*

ACTIVITY TABLE ENTRIES 49 AND 50 ARE CREATED FOR THREAD COMPLETION
(TRACE RECORDS 12 AND 13)

| ACTIVITY NUMBER | APPL TIME (MICRO S) | VP ID | TOTAL VPS | THREAD ACTIVITY ID | COMPL PTR | H# | PARENT PTR T# | PROGRAM NAME ISN | PU# PAT | LABEL/ DATA |
|---|---|---|---|---|---|---|---|---|---|---|
| 49 | 08259224 | 4 | 1 | ID TERM X0002 | | 2 | 45 1 | MATMUL 113 | D1 | |
| 50 | 08265841 | 6 | 0 | ID POST X0001 | | 3 | | MATMUL 113 | | |

ACTIVITY TABLE ENTRIES 47 AND 48 ARE UPDATED FOR COMPLETION PTR OF TERMINATING THREADS 2 AND 1

| ACTIVITY NUMBER | APPL TIME (MICRO S) | VP ID | TOTAL VPS | THREAD ACTIVITY ID | COMPL PTR | H# | PARENT PTR T# | PROGRAM NAME ISN | PU# PAT | LABEL/ DATA |
|---|---|---|---|---|---|---|---|---|---|---|
| 47 | 07365293 | 4 | 1 | PD INIT X0002 | 49 | | 45 1 | MATMUL 107 | D1 | |
| 48 | 07365293 | 6 | 2 | PD INIT X0001 | 50 | | 45 1 | MATMUL 107 | D1 | |

FIG. 5C

TRACE ANALYSIS
TABLE GENERATION
FIG. 6

FIG. 7 VISUAL GENERATIONS

VIRTUAL PROCESSOR ACTIVITY:

| R | ROOT TASK EXECUTION   | S | SECTION EXECUTION
| Tn | TASK n EXECUTION     | C | CALL EXECUTION
| Dn | DO LOOP n EXECUTION  | —— IDLE

CHART LOCKS = 10   CHART EVENTS = 0   LOCK WAITS = 2
EVENT WAITS = 0    AVG. CONCURRENCY FOR CHART = 5.253
                                    FOR TRACE = 5.253

Fig. 8 VIRTUAL PROCESSOR ANALYSIS

FIG. 9 PARALLEL PROGRAM EXECUTION HIERARCHY

FIG. 10 ABSTRACTION OF PARALLEL ACTIVITY TABLE

CONVERTING TRACE DATA FROM PROCESSORS EXECUTING IN PARALLEL INTO GRAPHICAL FORM

FIELD OF THE INVENTION

This invention relates to the evaluation of parallel program execution, and more particularly, to transforming discrete functional events recorded in trace data into time process diagrams depicting parallel activity duration, parallel process summary variables, and concurrency variables for evaluative purposes.

DESCRIPTION OF RELATED ART

Context

This invention treats the evaluation of parallel activity. Such processing is more complex than that of processing performed serially. This derives from the likelihood that several objects belonging to a common application and processed by independent virtual processors invariably exhibit unanticipated data dependences and resource scheduling limitations on the processing order.

The first attribute of interest is whether the parallel processed objects are deterministic or not. Next, there is a concern with respect to the recording of appropriate parallel processing events to permit either concurrent or subsequent replay evaluation. Finally, for purposes of this invention, there is the issue of selecting information of the parallel processing state and transforming it into a useful evaluative form.

Determinism and Nondeterminism in Systems and Code

A system or body of executable code is deterministic where it may be driven to the same state and outcome by repeating the history of events applied to it. However, where changes to availability of resources operate to change relative or absolute ordering of system state changes, then repeating history may not necessarily drive the system to the same state. In this case, the system or body of code is deemed nondeterministic.

Illustratively, rule-based inferencing and applications executing in parallel computing environments are systems prone to nondeterminism. The former is due to the fact that the rule set selected out by the change in the data set for the next execution cycle may be driven to two or more outcomes; and the latter because computations may include noncommutative operations and data dependences sensitive to changes in availability among processors. Consequently, nondeterminism in parallel processing places additional burdens on evaluative mechanisms such as debugging in contrast to mere sequential processing.

Logs, Traces, and Repeating History in Selected Systems

Logs and traces both connote time-ordered series of recorded indicia representing changes to the information and/or control state of a system. Log records have long been used in connection with transaction-oriented management systems to reestablish a prior state of information consistency in the event of fault, i.e., Baker et al., U.S. Pat. No. 4,498,145, "Method of Assuring Atomicity of Multi-Row Update Operations in a Database System", issued Feb. 5, 1985.

Traces have been used for both real time debugging of program sequences and for studies indicative of program and computing environment interaction. In the case of debugging of sequentially executed objects, the trace is used to assist in synchronizing the points in the object code with the counterpart source code structures and to display the synched points in meaningful ways.

Reference should be made to Saito et al., U.S. Pat. No. 4,730,315, "Diagrammatic Method of Testing Programs", issued Mar. 3, 1988 for the use of a trace in debugging in an imperative language application. Saito discloses a method for correlating FORTRAN source code and a directed graph representation thereof in step, edit, and retry modes.

Reference should also be made to Duisberg, U.S. Pat. No. 4,821,220, "System for Animating Program Operation and Displaying Time-based Relationships", issued Apr. 11, 1989. Duisberg uses a trace in the form of an explicit time recorded event ordering (time-ordered messages) to drive state changes among interactive objects in an object-oriented programming system (OOPS) operative as an application model, there being at least one visible manifestation of a state change.

Lastly, reference should be made to Darnell et al., co-pending U.S. patent application Ser. No. 07/245,475, "Two Step Debugger for Expert Systems", filed Sep. 16, 1988. Darnell uses a two-step method for debugging segments of code for rule-based inferencing embedded in segments of procedural code. Synchronism is established between the display of data objects and the rule conflict set by provision of a pre-fire and a post-fire rule display state, and a flow of control from one rule to another by use of a single step command.

Processes, Threads, Synchronization, and Concurrency in the Uniprocessor

As pointed out by McDowell and Helmbold, "Debugging Tools for Concurrent Programs", Board of Studies in Computer and Information Sciences, Univ. of Cal. Santa Cruz, published Feb. 4, 1988 at pages 27-32, sequential processes lend themselves to being analyzed by a single sequential output device. In this regard, a sequential program manifests only a single thread of execution. This can accurately be displayed as sequential text. In contrast, parallel processes include multiple threads where the data may be logically as well as physically distributed.

Ravi Sethi, "Programming Languages—Concepts and Constructs", copyright 1989 by Bell Laboratories, published by Addison-Wesley Publishing Company, chapter 9, "An Introduction Into Concurrent Programming", pages 343-379, asserts that a "process" corresponds to a sequential computation with its own thread of control. A "thread" of a sequential computation is a sequence of program points as measured by a traverse through the source code counterpart. Sethi further points out that interactions between processes involve the exchange of data either by an explicit message or through the values of shared variables. A variable is shared between processes if it is visible to the processes.

With respect to concurrent processing, synchronization relates the thread of one process to the thread of another process. If p is a point in the thread of process P and q is a point in the thread of process Q, then synchronization is used to constrain the order in which P reaches p and Q reaches q, i.e., the exchange of control information between processes.

According to Sethi, concurrent computations are describable in terms of events, where an "event" is an uninterrupted action. That is, an event is any construct that the procedural language treats as atomic. Consequently, a thread of a process corresponds to a sequence of events.

Relative Ordering and Concurrency

Where processes A and B respectively include steps 'abcde' and 'wxyz' and execute independently on a uniprocessor, then any interleaved order is acceptable as long as the relative order is preserved, i.e., 'abwxcyzde' is as acceptable as 'awbxcydze'. Obviously, where dependencies exist as with data or order, i.e., subroutining, coroutining, or nesting, then the interleaved order may be substantially restricted.

Parallel Processing and Language Extension

The term "parallel processing" connotes an application executing in a multiprocessor environment in which units of work are scheduled/dispatched as a function of virtual processor availability. The application may be expressed in a compiled form of a high-level language such as VS FORTRAN extended to include constructs defining the invocation, execution, synchronization, and termination of units of work concurrently executable. The extensions include:

| | |
|---|---|
| PARALLEL PROGRAM | |
| PARALLEL LOOP | iterations in parallel |
| PARALLEL SECTION | statements in parallel |
| PARALLEL CALL | |
| PARALLEL TASK | subroutines in parallel |
| ORIGINATE, SCHEDULE, WAIT FOR, TERMINATE | task management |

Parallel Processing, Trace Analysis, and Debugging

Altering either the correctness of an object (debugging) or the efficiency of computational resource use (tuning) necessarily relies upon trace information. The prior art is replete with attempts to provide the all-inclusive framework where either or both activities may be pursued.

Janice Stone, "Graphical Representation of Concurrent Processes", IBM Research Report RC 13662, April, 1988, discloses the use of a concurrency map and a trace to produce an animated playback of events for ascertaining correctness (debugging). Stone's concurrency map is a set of correlated event streams formed by displaying process histories on time grids and deriving dependency blocks therefrom as defined by interprocess dependences (see Stone, page 4). Stone asserts that the concurrency map is a necessary and sufficient description of all possible event orderings (page 5). Also, the map serves as a data structure for controlling graphic activity display as well as replay.

Mark K. Seager et al., "Graphical Multiprocessing Analysis Tool (GMAT)", Lawrence Livermore Laboratory Report UCID 21348, presented at NASA Ames Research Center on Mar. 25, 1988, depicts concurrent processes in the form of a global state transition diagram emphasizing timelines and icons.

SUMMARY OF THE INVENTION

It is accordingly an object of this invention to devise a computer-implemented method for evaluating resource utilization and parallelism with respect to computations executing concurrently on one or more virtual processors.

It is yet another object to devise a computer-implemented method for analyzing the functional events occurring during parallel execution to derive parallel process summary variables, parallel activity duration, and concurrency variables, the functional events being recorded in real time and not virtual time.

It is a related object that the computer-implemented method graphically depict resource utilization and parallelism as an aid to (1) improving the performance of parallel applications by load balancing and the like, (2) verifying parallel execution paths such as whether a parallel loop is executed in parallel or serially, and (3) debugging such as by identifying execution time data and resource dependences.

It was unexpectedly observed that if selected portions of the trace data were reformatted such that events initiating and terminating parallel activity were linked, then a traverse of reformatted data could be used to derive and display time process diagrams. Such reformatting and linking takes advantage of the fact that the other factors identifying the state of the computations and virtual processors are highly correlated with events evoking parallel activity. The other factors include processor, task ID, and time indicia. It was also observed that a traverse or decomposition of the reformatted trace data could be used to create the time process diagrams to depict (1) virtual processor utilization in terms of active, idle/wait or unavailable states; and (2) functional decomposition of elements of an executing hierarchy of parallel tasks.

More succinctly, the foregoing objects are satisfied by a computer-implemented method for converting trace data obtained from concurrently executing virtual processors into graphical form. The method comprises the steps of: (a) forming a table from the trace data generated by said processors identifying and cross-linking the virtual processor, task ID, parallel activity, and one or more parallel activity metrics; and (b) graphically mapping the table elements onto a display (1) as indexed by the processor and activity crosslinks for showing processor utilization, and (2) as indexed by the activity crosslinks for showing the executing hierarchy of parallel activities.

The table correlates time of occurrence, virtual processor, task ID, at least one event initiating parallel activity, and a pointer to a terminating event for the parallel activity initiated by the current event. The processor utilization display is driven by a primary sort on virtual processor ID and a secondary sort on the event trace of the table. Similarly, the executing parallel task hierarchy display is driven by a primary sort on the task ID and a secondary sort on the linked activity. Also, the parallel activity display may be expedited by use of an inverted index into the table by way of a task ID.

Invention Contrasted With the Stone Reference

Stone's animation (pages 8-10) is directed to dynamic visualization for improving correctness (debug purposes). Thus, if Stone were to display load balancing among concurrently executing virtual processors, it would appear as a sequence of quasi-random abrupt transitions. In contrast, the method of this invention is in aid of tuning. It exhibits measured or weighted variables such as average processor active, idle, or wait state distribution over discrete points in time. The points occur at in time designated forks and joins of threads of parallel activity. That is, the method is directed to activity occurring at parallel processing endpoints whose display is synchronized with a traverse of crosslinks embedded within a reformatted trace primarily sorted on either a virtual processor ID or task ID and secondarily sorted on events.

DESCRIPTION OF THE PREFERRED EMBODIMENT

Aspects of FORTRAN and Parallism Using Language Extension

A FORTRAN language extended for parallel execution typically contains constructs which permit a main program or task to originate, invoke, and terminate subtasks. It is anticipated that tasks are originated and terminated relatively rarely. However, once originated, tasks are invoked repeatedly. The invocation may be in a form which requires the calling task subsequently explicitly to wait for the subtask to complete. Alternatively, it may be in a form in which the subtask is enabled to complete execution with no explicit wait by the calling task.

FORTRAN programs typically involve the creation, manipulation, and finally deletion of subordinate tasks. Each task is independent. Except for data shared between a calling and a called task, and except for files manipulated jointly by two tasks, the execution of one task is ideally independent of and cannot affect the execution of another task.

Further particulars are set forth in the following IBM publications: VS FORTRAN Version 2 Programmer's Guide Release 5 (IBM Publication SC26-4222-5) and VS FORTRAN Version 2 Language and Library Reference Manual Release 5 (IBM Publication SC26-4221-5).

Reference should also be made to Karp et al., copending patent U.S. Pat. No. 5,093,916, issued Mar. 3, 1992, "Method for Reducing Conflict Among Tasks Concurrently Accessing Common Blocks in Sequences Compiled from a FORTRAN-like Language System", filed May 20, 1988, for a discussion extending the FORTRAN language system to emphasizing parallel constructs and communication among tasks.

Some FORTRAN Extensions

Figure 1:
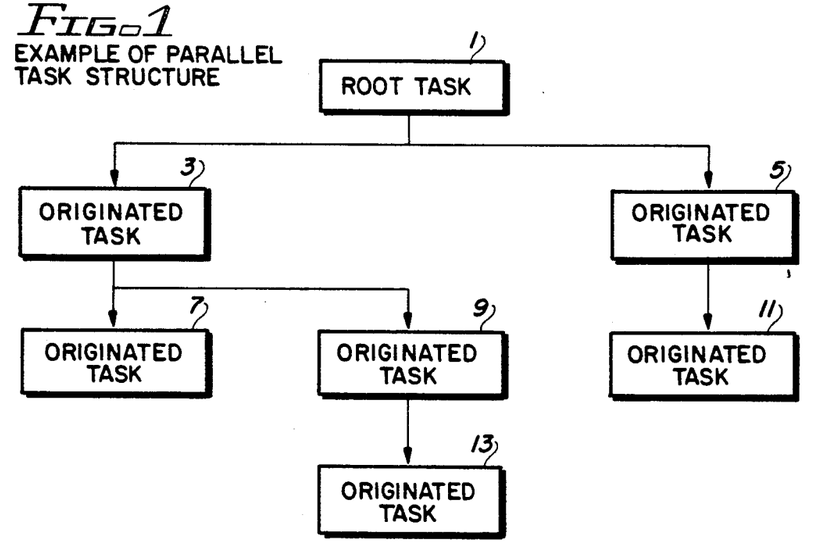
FIGS. 1-3 depict respectively the hierarchic organization of parallel tasks, the relations between virtual processors to parallel tasks and threads, and a parallel thread hierarchy as constructs in an extended FORTRAN language system.
Figure 3:
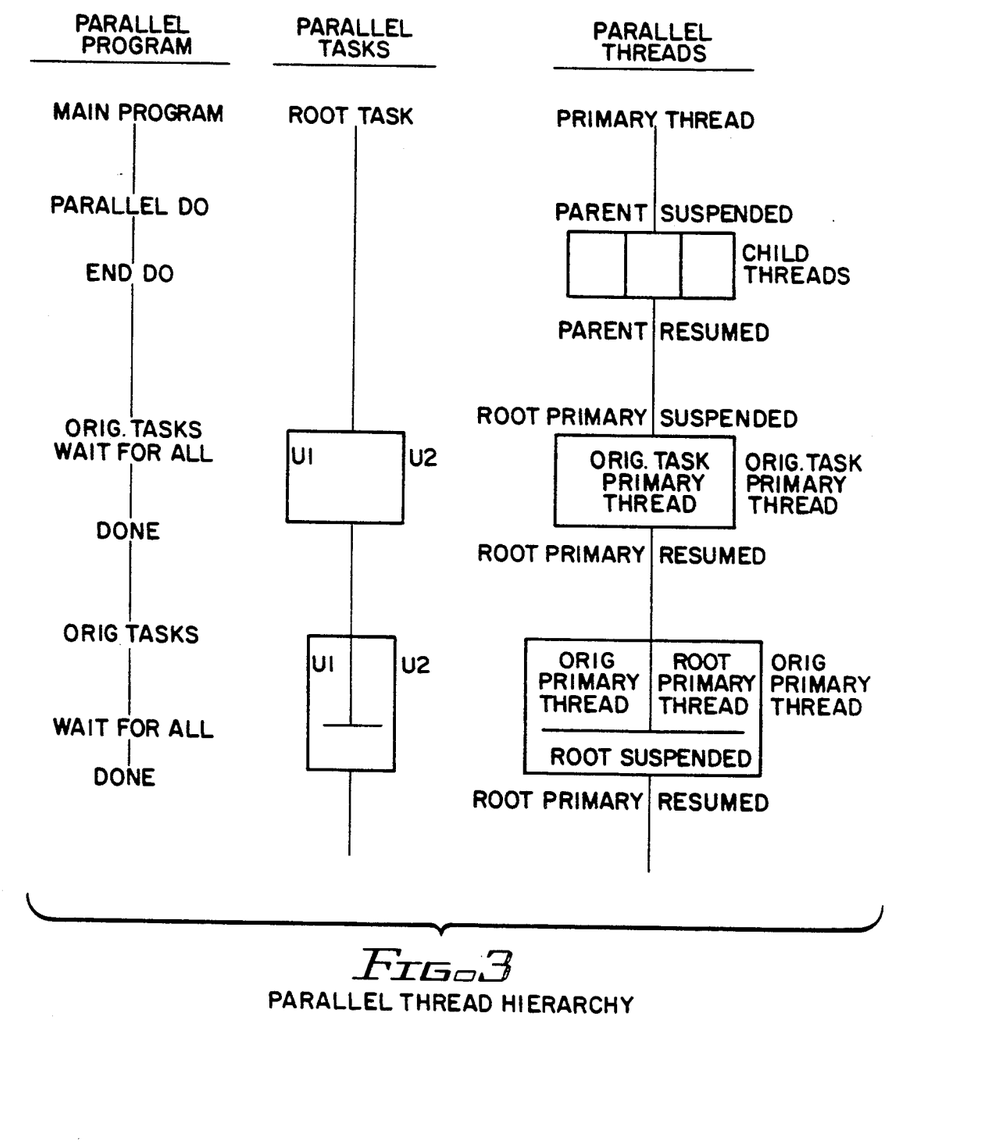

The FORTRAN language extensions are used both to support the task hierarchy shown in FIG. 1, the parallel thread hierarchy shown in FIG. 3, and to secure selective parallel operations as found, for example, in the IBM FORTRAN Version 2 Release 5 language system. The constructs are defined as:

A PARALLEL PROGRAM is an executable object (program) including one or more of the language extensions, an object compiled for automatic parallelization, or a program using lock or event service routines.

A PARALLEL LOOP (equivalent of DO) includes a set of statements executed as long as a specified condition exists. Each iteration of the loop can be executed concurrently with other iterations of the loop. Valid operation requires computational independence or controlled access to modified shared data areas. In contrast, the permutative order of iteration for a serially processed loop is generally limited or predefined.

A parallel loop is explicitly created either by a PARALLEL DO statement, or is generated by automatically parallelized DO loops. Each iteration of the loop can be a parallel thread executed by a virtual processor. Also, groups of iterations are combinable into a single thread executed on a virtual processor. The number of virtual processors concurrently participating in parallel loop execution depends on the amount of other parallel work to be executed. For example, a parallel group of 10000 iterations could be partitioned into four groups of 2500 iterations. These iterations could be executed on two virtual processors. In this regard, one virtual processor might execute three groups while the other processor could execute one group.

A PARALLEL SECTION is a group of sequentially executed statements. Each section can be executed concurrently with other sections in the parallel section.

A PARALLEL TASK is an abstract data type in which PARALLEL THREADS are completely specified for execution including data storage. A ROOT task designates the point where program execution starts. Additional parallel tasks are created with ORIGINATE statements and are managed by SCHEDULE, WAIT FOR, and TERMINATE statements.

Referring now to FIG. 1, there is shown multiple levels of parallel tasks 1-13. When multiple levels of parallel tasks are created, a hierarchical ownership structure is established. Originated tasks 7, 9, 11 are "owned" by the counterpart parallel tasks 3, 5 in which a task ORIGINATE statement was specified. Also, task 9 is the parent of task 13. Lastly, the root task 1 is the highest level of the parallel task structure.

A PARALLEL THREAD is a unit of work eligible for concurrent execution. A parallel thread can be a subroutine, loop iteration, or section of code. For each of these, the thread contains the functions invoked within them, and the subroutines invoked within them with the CALL statement. Parallel processing is achieved by execution of multiple threads simultaneously. The parallel language statements may dispatch one or more additional parallel threads for concurrent execution. Such a dispatched or child parallel thread is not considered to be part of the parent thread but a separately executable entity. Significantly, when a PARALLEL PROGRAM is executed, it begins with the primary parallel thread thereof.

Parallel threads execute in the same task in which they were dispatched when they are bounded by parallel DO, SECTION, or CALL statements. Also, they can execute in different parallel tasks from the one within which they were dispatched when the SCHEDULE construct is used.

Referring now to FIG. 3, there is depicted the inherent nondeterminism or parallel processing. This derives from two sources; namely, the concurrency/wait relations among tasks, and the availability of virtual processors. In this figure, a parallel thread hierarchy is expressed as three correlated vertical timelines with time increasing from top to bottom. On the top left, a parallel DO is set out. This may be manifest in the form of many hundreds of threads. Where the parallel DO originated from a parent task, nominally the parent would be suspended until the threads of the parallel DO were executed.

Referring again to FIG. 3, the next two rows depict an originating task and its time overlap or concurrency relationships with either child tasks or independently originated tasks. In this regard, the threads of an originating task can either be suspended or continue in overlapped relations. In FORTRAN, the WAIT FOR construct is used to control the point where an originating task will suspend itself in relation to child tasks and even the root task thereof. The middle row depicts where the WAIT FOR ALL construct was executed at the beginning of the invocation of the invoked tasks, whereas in the bottom row the WAIT FOR caused the root task to be suspended well into the execution of hierarchically subordinate tasks.

Virtual Processors and Threads of Execution

Figure 2:
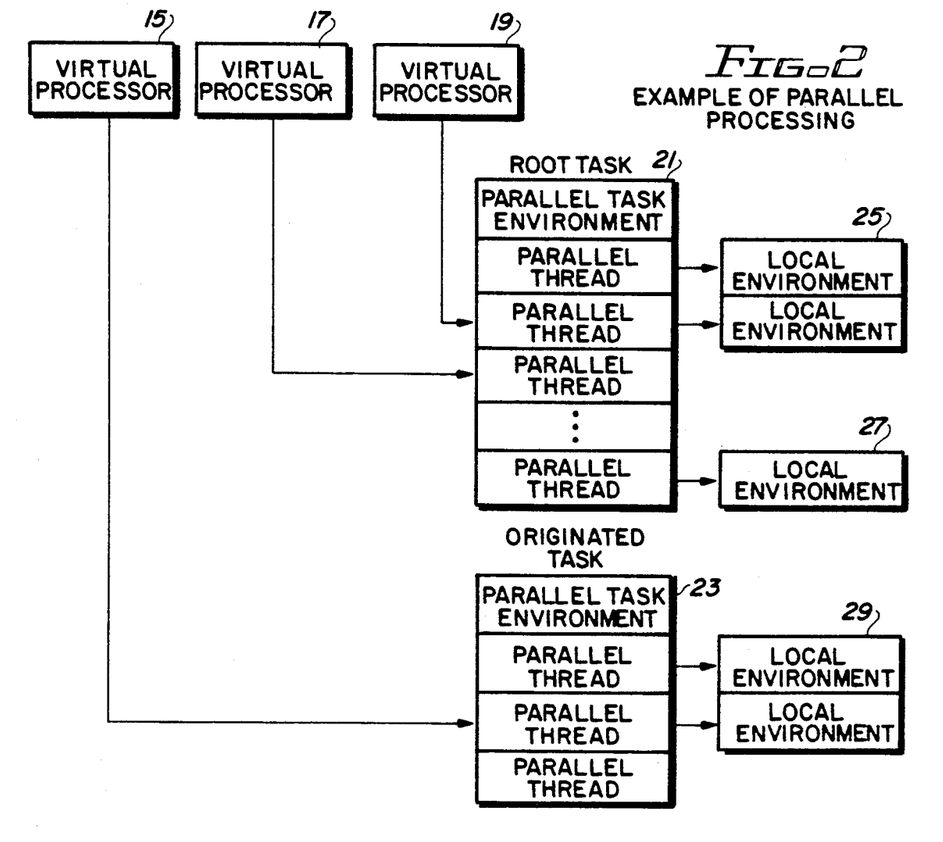

Referring now to FIG. 2, there is shown the operative relationships among virtual processors 15-19, parallel tasks 21-23, attendant threads, and local environments 25-29. Each of the virtual processors is a logical processor upon which a primary parallel thread is executed. As the execution proceeds, other parallel threads are dispatched by the parallel language constructs in the manner of FIG. 2. FORTRAN as a compiled language system specifies the execution or runtime (local environment) environment including the number and management of the virtual processors. However, the binding of virtual to real processors is controlled by an operating system such as MVS and not the compiled parallel FORTRAN based application.

When multiple virtual processors are specified, dispatched parallel threads can be executed concurrently. If all the virtual processors are active, the parallel thread will wait for execution until a virtual processor becomes available. The ORDER OF EXECUTION of parallel threads may vary between one run of a parallel program and another. It should be appreciated that the explicit language constructs and lock and event services can be used to impose a degree of order, especially in the presence of data dependences. In batch oriented operating systems such as MVS, a virtual processor corresponds to the MVS task. Similarly, in a VM-like operating system, a virtual processor corresponds to a virtual CPU. Note, it is the operating system rather than the compiled runtime code (application) which binds and schedules the virtual processors to the real processors.

When a parallel program executes with one virtual processor, parallel threads do not execute concurrently. Rather, they execute in a quasi-serial manner. Part of a thread may be executed, and then execution may be suspended due to synchronization requirements so that another parallel thread may be executed. The original parallel thread can resume after the second thread completes. Recall that in such processing it is necessary to preserve the relative order of events or steps within a thread. This process, which occurs when there are not enough virtual processors to maintain a one-to-one correspondence between parallel threads that have begun execution and the processors, is called "redispatching".

Building the Table

Figure 4:
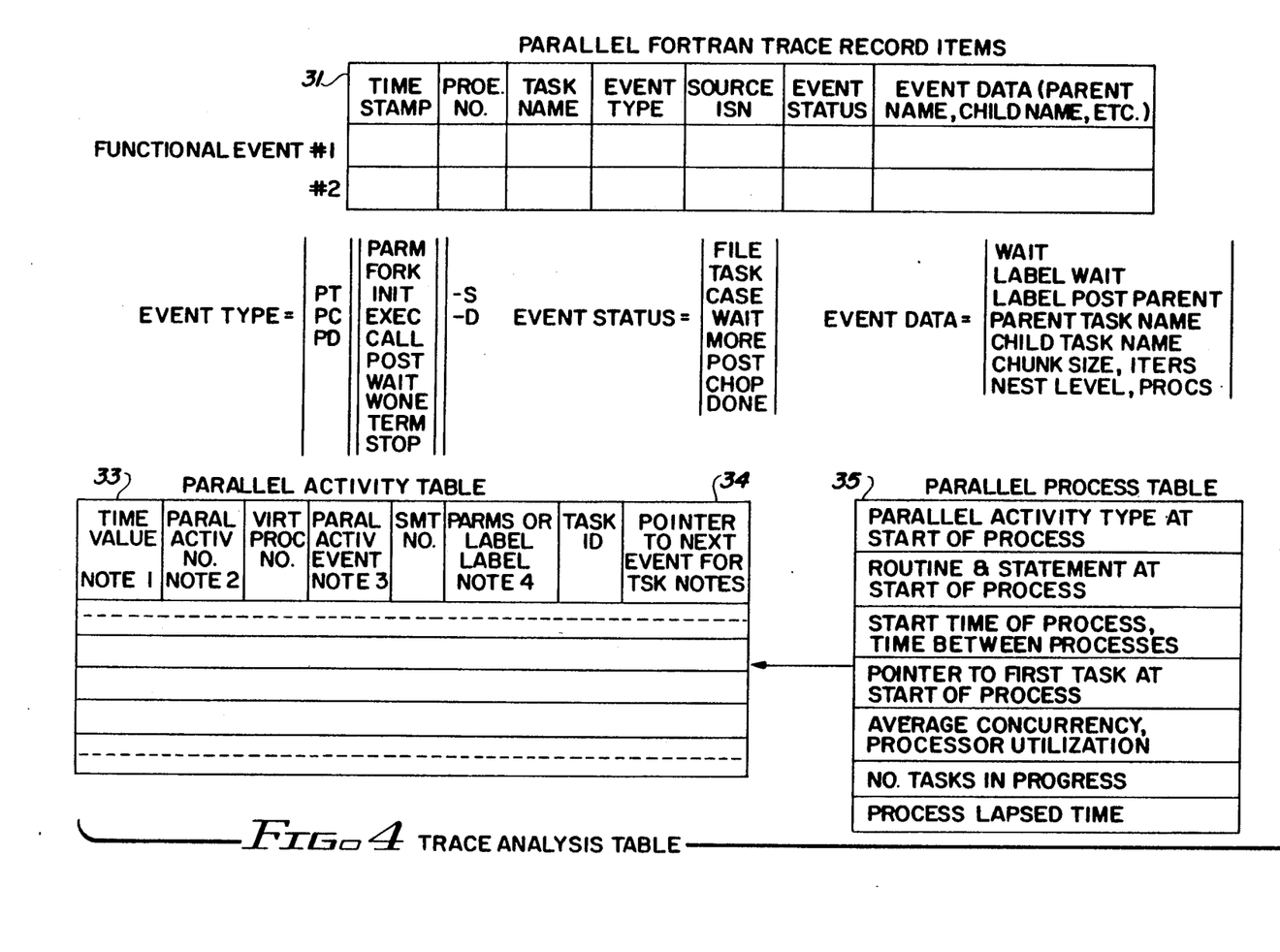
FIG. 4 shows prototypical trace data and the processing constructs (parallel activity table) derived therefrom according to the invention.

Referring now to FIG. 4, there are shown prototypical trace and prototypical processing constructs according to the invention. Trace 31 is a timestamp sorted log of attributes associated with parallel processing events. The event types include FORK and JOIN. In the older literature, (Holt et al., "Structured Concurrent Programming With Operating Systems Applications", copyright 1978 by Addison-Wesley publishing Company, pp. 18 and 31) FORK denoted branching to concurrent processing tasks and JOIN was a point of termination. The recorded attributes include the virtual processor ID, event type, task ID, etc. Now one step of the method of the invention is to reformat and reprocess the trace. The resultant constructs 33, 35 are termed a parallel activity and a parallel process table. Each reformatted entry for a trace event in the activity table 33 includes a unique activity number and a pointer 34 to the terminating event for the parallel activity started with the current event.

The parallel process table 35 is derived from the activity table 33. It constitutes a mix of an inverted index into the activity table and a store for computations of selected concurrency variables. The significant use of table 35 is with respect to expediting generation of the display of the executing hierarchy of parallel tasks. This latter is accomplished by including a pointer to the first task in the activity table 33 at the start of a process and then following the pointers.

Referring now to FIGS. 5(a) to 5(c) and 6, there are respectively depicted an actual trace 31' and activity table 33' and a flow of control for executing the activity table build. The object is to reformat trace 31', and add to it appropriate control numbers and pointers in order to appear in form similar to that of 33'.

Figure 5A:
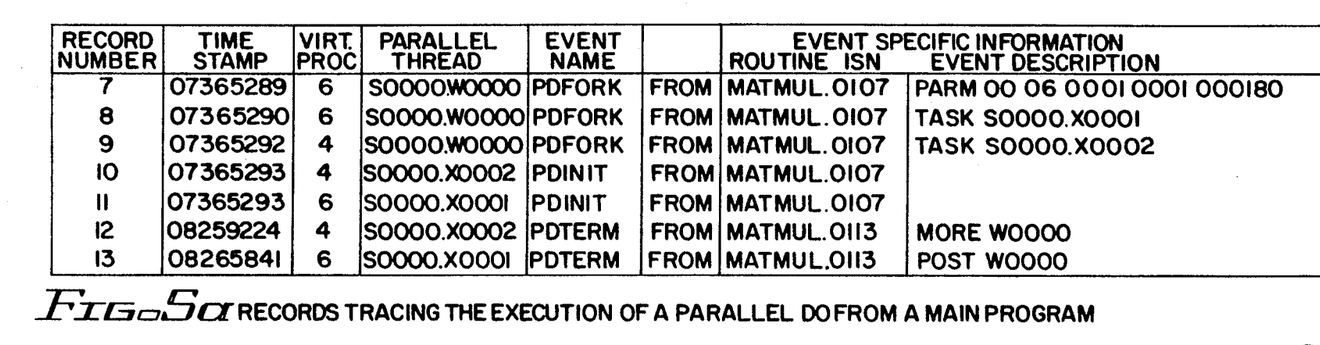
FIGS. 5(a) to 5(c) provide a snapshot of an actual trace of parallel activity and concomitant parallel activity table entries, the completion pointer entries being derived during trace analysis.
Figure 5B:
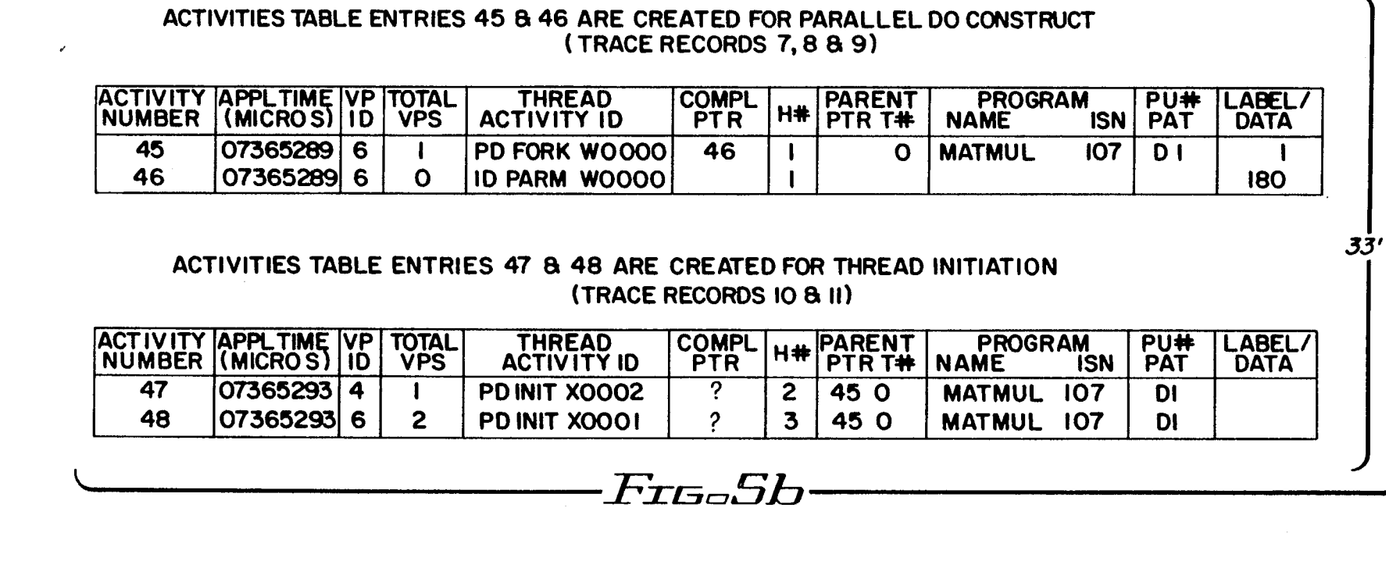
Figure 5C:
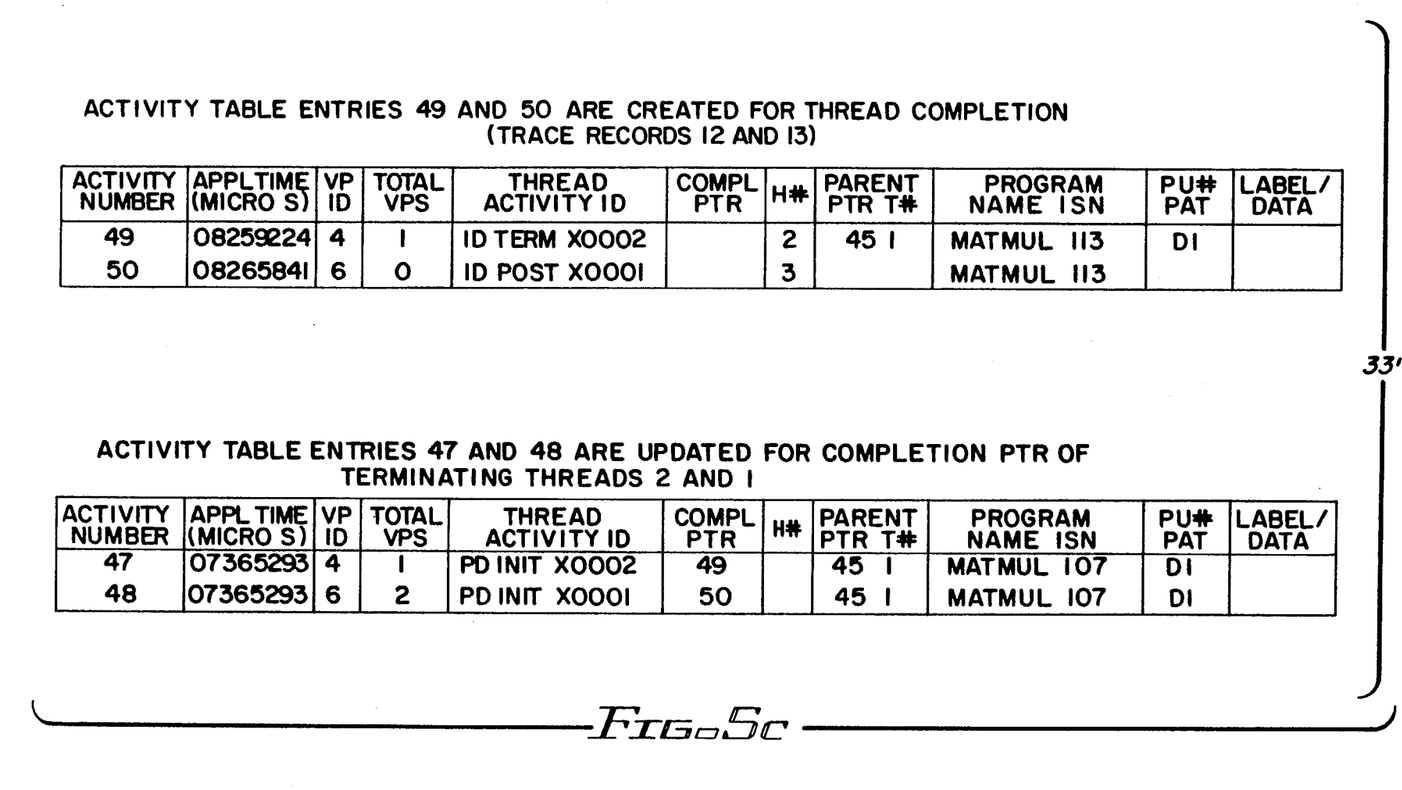

As expressed in FIGS. 5(a) to 5(c) trace 31' comprises records 7-13 of which records 7-9 relate to a parallel DO, records 10-11 pertain to a thread initiation, and records 12-13 concern thread termination. Relatedly, activity table 33' is commented to correlate the trace records and activity table entries. Illustratively, the trace records of the parallel DO are transformed into activity table entries 45 and 46.

Figure 6:
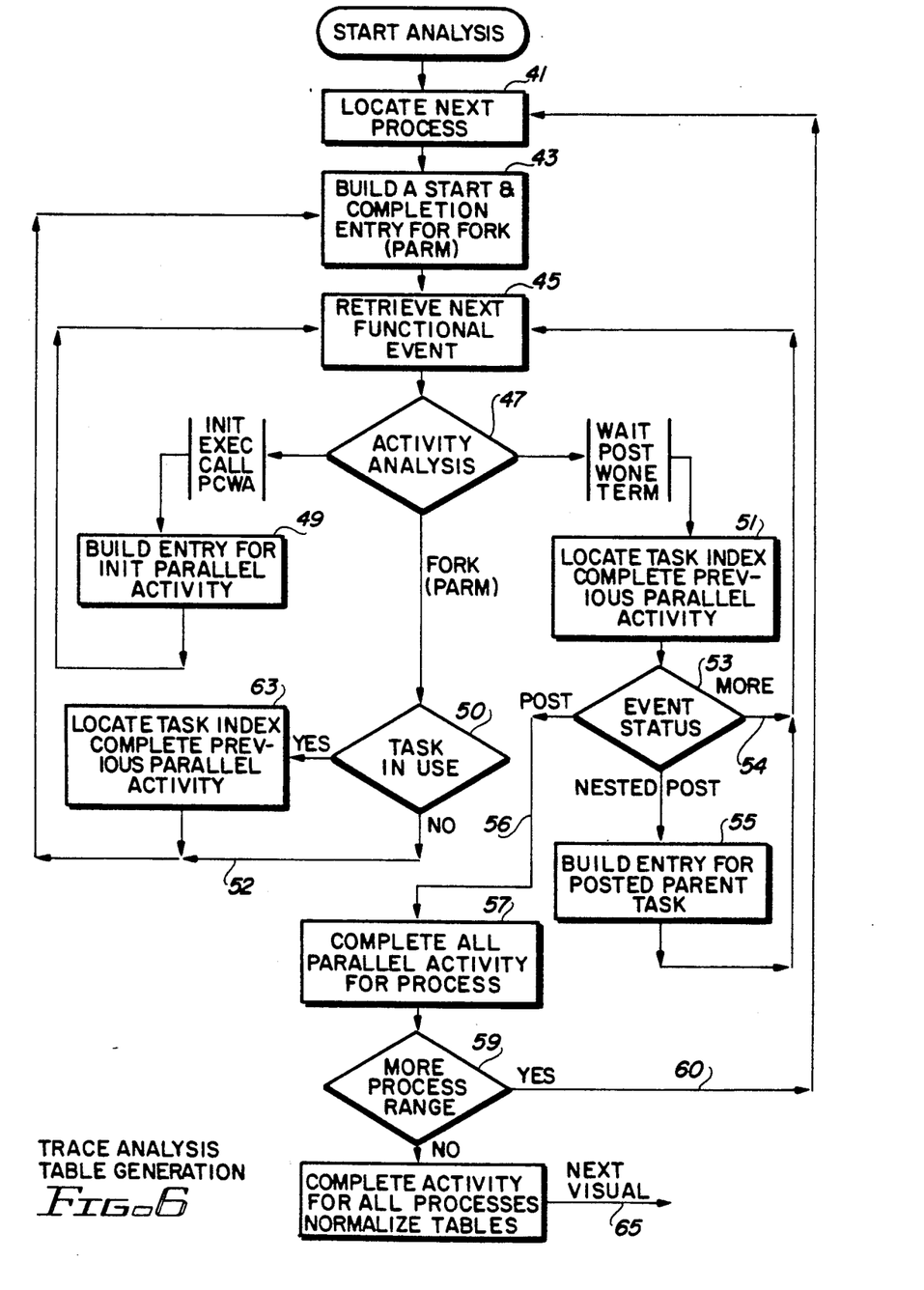
FIG. 6 depicts the flow of control for the table build according to FIG. 5.

Referring to FIG. 6, the start of table build involves the scanning the trace records for the purpose of locating the beginning of a requested parallel process. This is accomplished (step 41) by recognition of those functional events associated with starting parallel activities i.e. FORK or INIT (termed PDFORK and PDINIT in FIGS. 5(a) to 5(c). Next begins the step 43 of creating a table entry for the parallel process. This includes saving the name of the application, statement number, parallel activity type, pointer-to-activity task table, start time of process, and parameters and initialization data.

Responsive to the retrieving of the next functional event from the trace (step 45), the method recognizes the appropriate functional event termination trace records for each parallel activity (step 47). Next, using the task ID from the termination record, the last parallel activity started for the task is located and its activity status is set to open "completed".

The method also creates a completion entry in the parallel activity table to save the completion time, statement number, case labels, and completion reason. A pointer to the completion entry is added to the started entry for each parallel activity (step 51). If the task completed has "more" status, the method looks for more functional events for the process (steps 53, 54, 45). This task is completed with a synchronization post, and the label identifier is stored in the activity completion entry before scanning for more events (steps 56, 57). For a nested "post", a new parallel activity using the parent task name is generated and the start time is assumed to be the post time (step 55). For a terminal post at a next level of zero, the parallel process is considered complete and the parallel activity and parallel tables are updated with appropriate time and completion data (steps 59, 61, 65).

Time process displays are generated using the starting statement of each activity as the ordinate access label and time within the parallel process as the abcissa label. Ending statement numbers and synchronization labels are added at the end of each time process displayed. The time process display of virtual processor utilization is generated using the virtual processor number as the ordinate access and the time gyration for one or more parallel processes as the abcissa.

Figure 10:
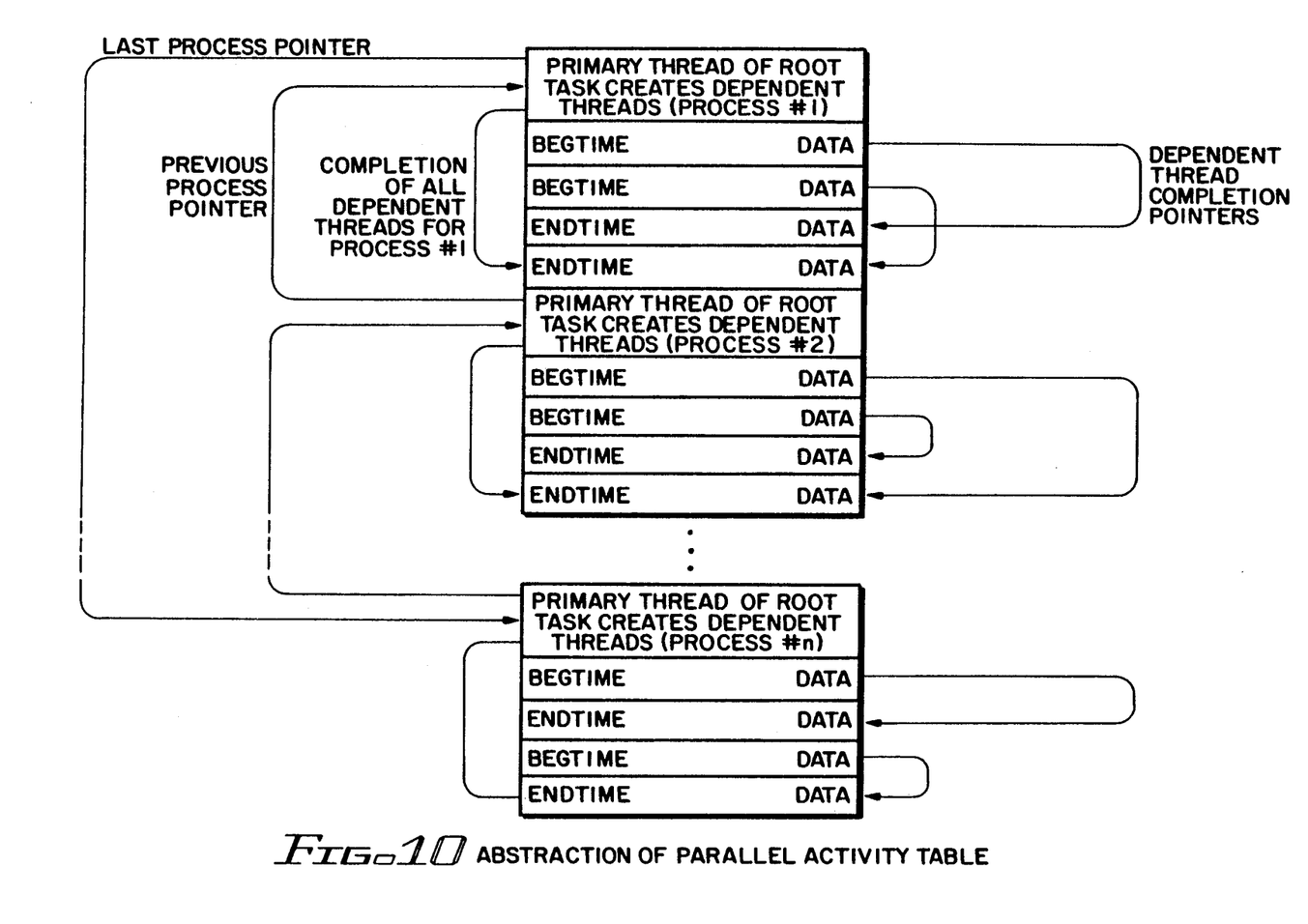
FIG. 10 is an additional abstract view of the parallel activity table of the type depicted in FIG. 4.

Referring now to FIG. 10, there is shown an abstraction of the parallel activity table as depicted in FIG. 4. The abstraction shows the chaining within each table and the linkage between the primary thread activity and the dependent thread activity. In FIG. 10, there is a new entry in the activity table each time the root parallel task primary thread creates dependent threads.

In FIG. 10, the creation of dependent threads initiates parallel or concurrent activity by switching from one to multiple virtual processors. It should be noted that each primary thread process has a pointer to the completion of all dependent threads, thereby returning control to one virtual processor. Also, each process entry has a pointer in the parallel activity table to a previous process. This can be used for backward scrolling. Furthermore, each virtual processor used for a primary thread process has an activity table entry for both the first dependent thread and the last dependent thread that the processor executes. Lastly, each first thread entry has a pointer to the last thread entry for a given processor.

The pointer to the last thread entry, operates as the completion pointer for a group of dependent threads executed by a single processor. Parenthetically, the recorded time for the first thread executed by each processor also serves as the startime of that thread's execution. Similarly, the recorded time for the last thread executed by the processor is the completion time of that thread's execution, or the completion time of that processor.

Mapping From the Table to the Display

Referring now to FIGS. 5(*a*) to 5(*c*) and 7, there are respectively set out selected portions of an activity table 31' and the flow of control used to recursively decompose and graphically map the table elements onto a display. Note, steps 67–93 in FIG. 7 relate to the generation of a time process display of virtual processor utilization, while steps 91–119 in FIG. 7 pertain to the time process display of an executing hierarchy of parallel tasks.

Figure 8:
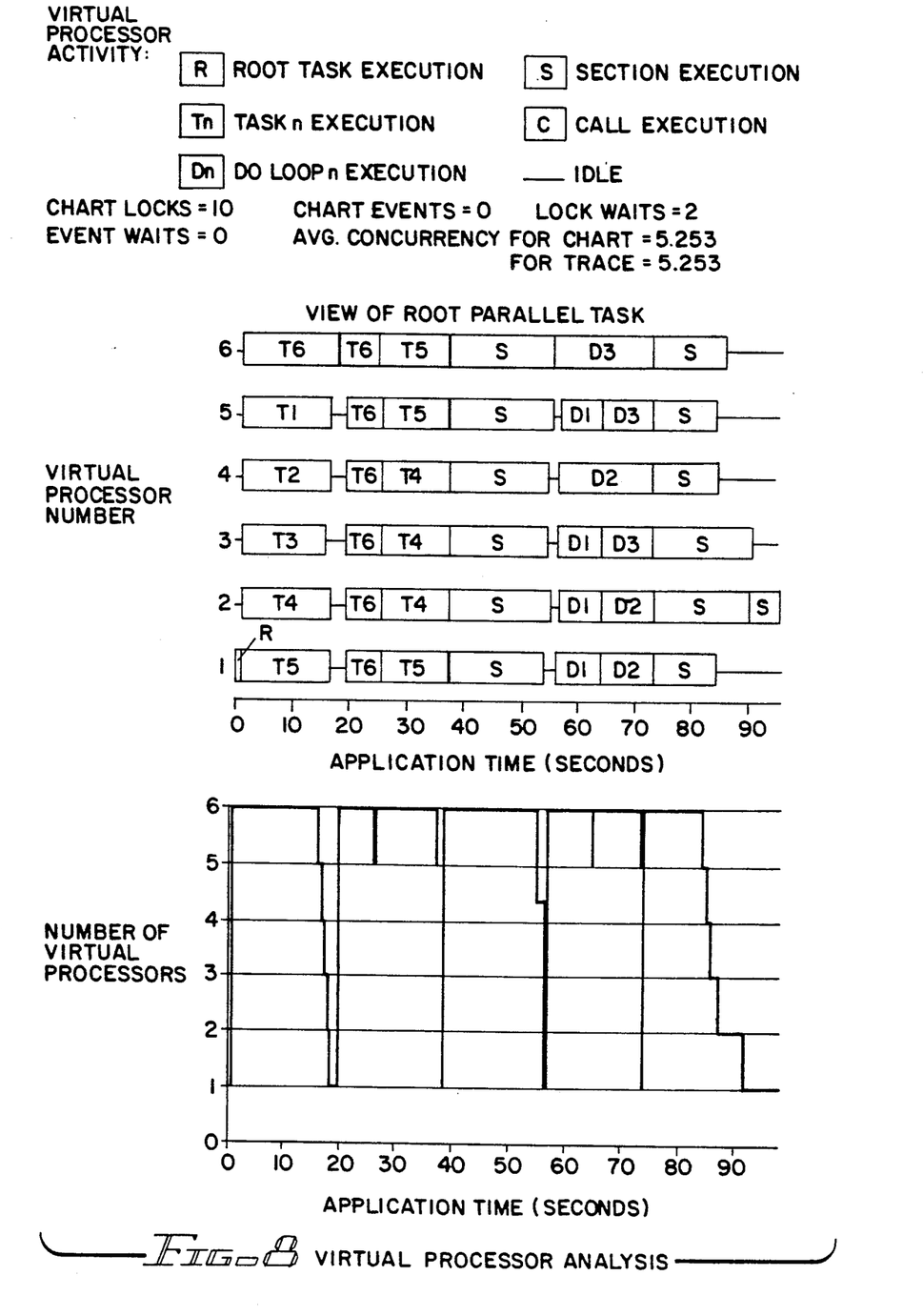
FIGS. 8 and 9 respectively embody the time process display of processor utilization over time and parallel activity task management over time.
Figure 9:
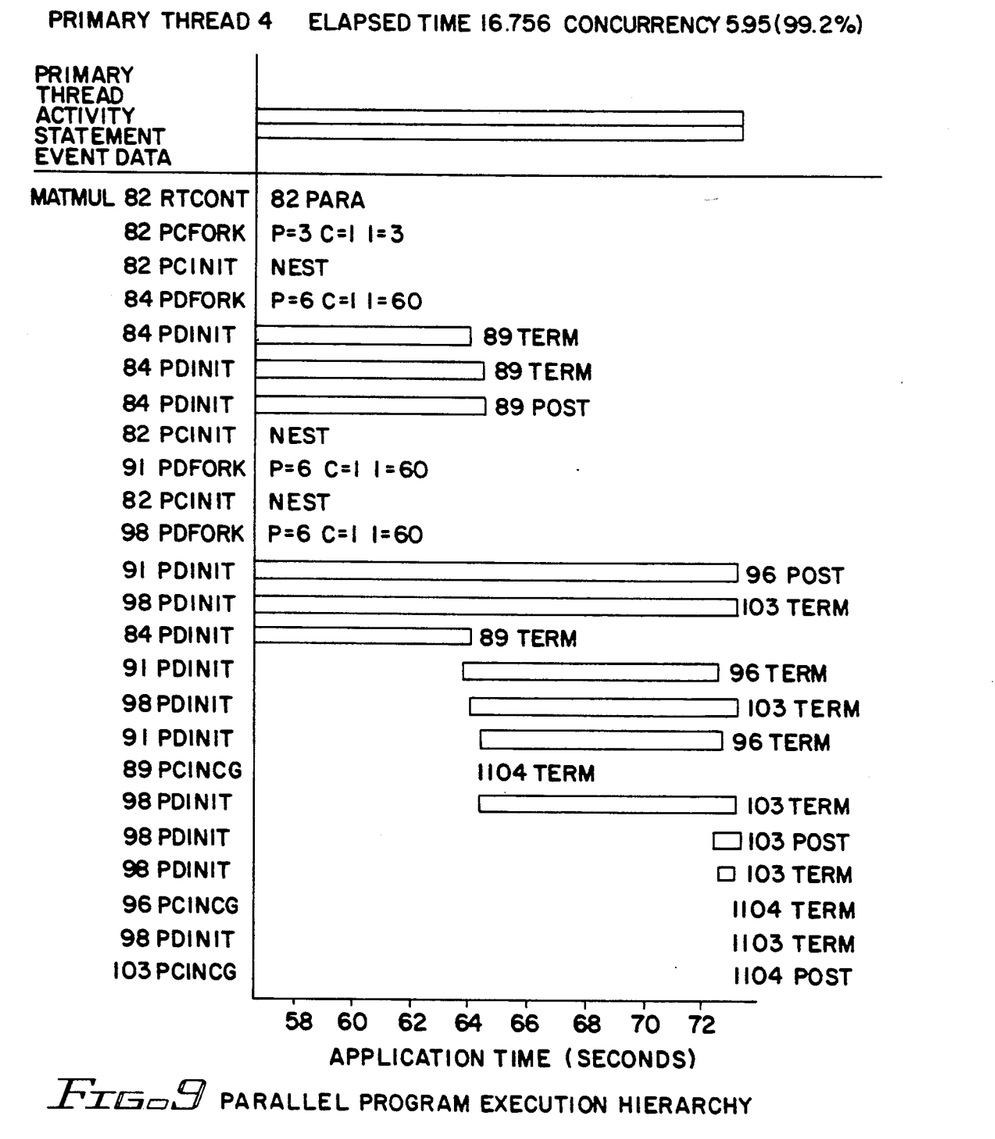

Referring now to FIGS. 8 and 9, there are depicted distinctive types of time process diagrams. FIG. 8 sets out a timeline of utilization. It also displays counterpart bar charts color coded with references to the processor activity state. With regard to utilization, a processor concurrency variable is defined as the number of virtual processors being used at any instant in time for task execution. An average concurrency variable is computed by integrating the processor concurrency as a function of time and dividing by the process time to get the effective number of processors. Significantly, this display permits review of how much work switching between virtual processors has occurred. It also permits ascertaining how the parallel tasks are allocated among the processors, their order of execution, etc.

Generation of the Virtual Processor Utilization Diagram

Referring now to FIGS. 8 and 10, it is the case that the time process diagram depicting virtual processor utilization is created by processing the parallel activity table once for each virtual processor ID. The beginning and end times for each primary thread process are compared to the time range of the selected view (Tmin, Tmax) to determine that one or more dependent thread activities is visible in the diagram time range. Beginning and end time thread execution for the selected processor is then compared with the diagram time range to determine if that part or all of the activity is visible in the diagram time range, i.e., (activity begin time $<=$ Tmax) and (activity completion time $>$ Tmin)

If activity begin time is $>=$ Tmin and activity completion time $<=$ Tmax, then a graphical surface area is generated for the view. For activities where the beginning or completion exceeds the diagram time range, a standard clipping method is used to display the visible portion of the activity.

The Tmin and Tmax diagram range variables have corresponding process beginning and ending numbers for display eligibility. When visible thread activities have been graphed for the ending process corresponding to Tmax, the method of this invention returns to graph the next processor utilization.

The first processor utilization diagram may be a diagram with the time range starting at zero time and ending at application end time, i.e., Tmin=0 and Tmax=application end time.

From a processor utilization diagram of a given time range, the method of the invention as displayed on an interactive system, permits an operator to choose to zoom or scroll forward or backward to obtain a processor utilization diagram with a new time range (Nmin, Nmax). In this regard, three views or displays can be most advantageously utilized. These include zoom, forward, and backward view.

The "zoom view" expands a portion of the current time and clips activity data at the zoom view time boundaries (Nmin, Nmax selected by the user from the existing diagram time range Tmin $<=$ Nmin $<$ Tmax Nmin $<$ Nmax $<=$ Tmax).

The "forward view" starts a new view at some point in the current view (Tmin $<=$ Nmin $<$ Tmax) going forward for a time range including parallel activities in a new diagram time range (Nmax=Nmin + Tmax − Tmin).

The "backward view" starts a new view at some point in the current view (Tmin< =Nmax<Tmax) going backward for a time range including parallel activities in a new diagram time range (Nmin=Nmax − Tmac + Tmin).

For each new processor utilization diagram the Tmin and Tmax variables are set with the Nmin and Nmax values respectively, and corresponding new process beginning and ending numbers for display eligibility are determined.

In addition, root parallel task primary thread execution is active on a single virtual processor from the completion time of each process number to the next process start time, i.e, the time between the last processor execution of a dependent thread and the next primary thread generation of new dependent threads.

A Virtual Processor Concurrency diagram is easily created by plotting the total number of processors active at each activity time between the time range of a requested chart. The numbers used were computed from the number of active processors entered in the activity table at each new entry to the activity table.

Generation of Parallel Activity Diagram

Referring now to FIGS. 9 and 10, it is apparent that the parallel activity diagram is created by selecting an individual primary thread (process number) from the activity table to produce time process display. The beginning and end times for the process number become the Tmin and Tmax for the diagram time range. Beginning and end time of dependent thread execution on each virtual processor is then graphically generated. The sequence of generation is based on the hierarchy number found in the activity table (H#), i.e, activities with the same number are plotted on the same vertical axis value, beginning and completion of virtual processor activity on dependent threads being one example of this. The starting data is placed in column format at the left of the activity plot, and the completion data is placed at the end of activity as notes. Temporary barriers such as variable locks are another example. Parenthetically, zooming of the time range of the parallel hierarchy of a primary thread works in a manner similar to zooming on a Virtual Processor Utilization diagram.

Referring again to FIG. 9, there is depicted the parallel task activity in terms of hierarchical execution of a parallel program. Any application must specify nested parallelism by using parallel constructs within a parallel task environment. The multiple levels of parallelism are specified by using task management constructs indicative that other parallel tasks may execute concurrently for both nested parallelism and multiple levels of parallelism. There is shown a hierarchy defined between the parallel threads that execute at runtime. The time process diagram of parallel task activity shown in FIG. 9 permits one to ascertain for each parallel thread when it was scheduled for execution, when it was executed on a virtual processor, when it was suspended, when it was waiting, and when it completed its execution.

Advantageously, a graphical data display manager (GDDM) can be invoked for "coloring" a display as correlated with one or more entries in the activity tables 33 or 33' as the table is traversed with selective table elements onto the display. GDDM provides a physical interface to display terminals and plotters and is required to show the charts defined in this invention. In addition, the interactive features utilize GDDM handling of interrupts invoked by keyboard/keystroke activation of operator requests, e.g., operator selection of new, beginning, and ending time of a Virtual Processor Utilization diagram for a zoom view.

World coordinate systems are used to facilitate presenting charts on any physical terminal or plotter. Reference should be made to IBM Publication SC33-0148, published in November, 1984, "GDDM Application Programming Guide" for the generation of rectangular graphical areas using GDDM library calls such as:

Set graphical pattern
Set graphical color
Start area
Start rectangle lower left
Move to upper left of rectangle
Move to upper right of rectangle
Move to lower right of rectangle
Close rectangle at lower left
End area While the invention has been particularly shown and described with reference to a preferred embodiment hereof, it will be understood by those skilled in the art that several changes in form and detail may be made without departing from the spirit or scope of the invention.

I claim:

1. A computer implemented method for converting trace data into graphical form, said trace data being obtained from concurrently executing virtual processors, comprising the steps of:
    (a) reformatting said trace data into a linked list of successive events evoking parallel activity for at least a first parallel task, said list including at least one link; and
    (b) selectively traversing said at least one link of said list and causing time process display of processor utilization and any executing hierarchy of parallel activity constructs formed from at least one parallel thread hierarchy of a parallel program, at least one parallel task, and at least one parallel thread (FIG. 3), said time process display being in synchronism with said traversal.

Figure 7:
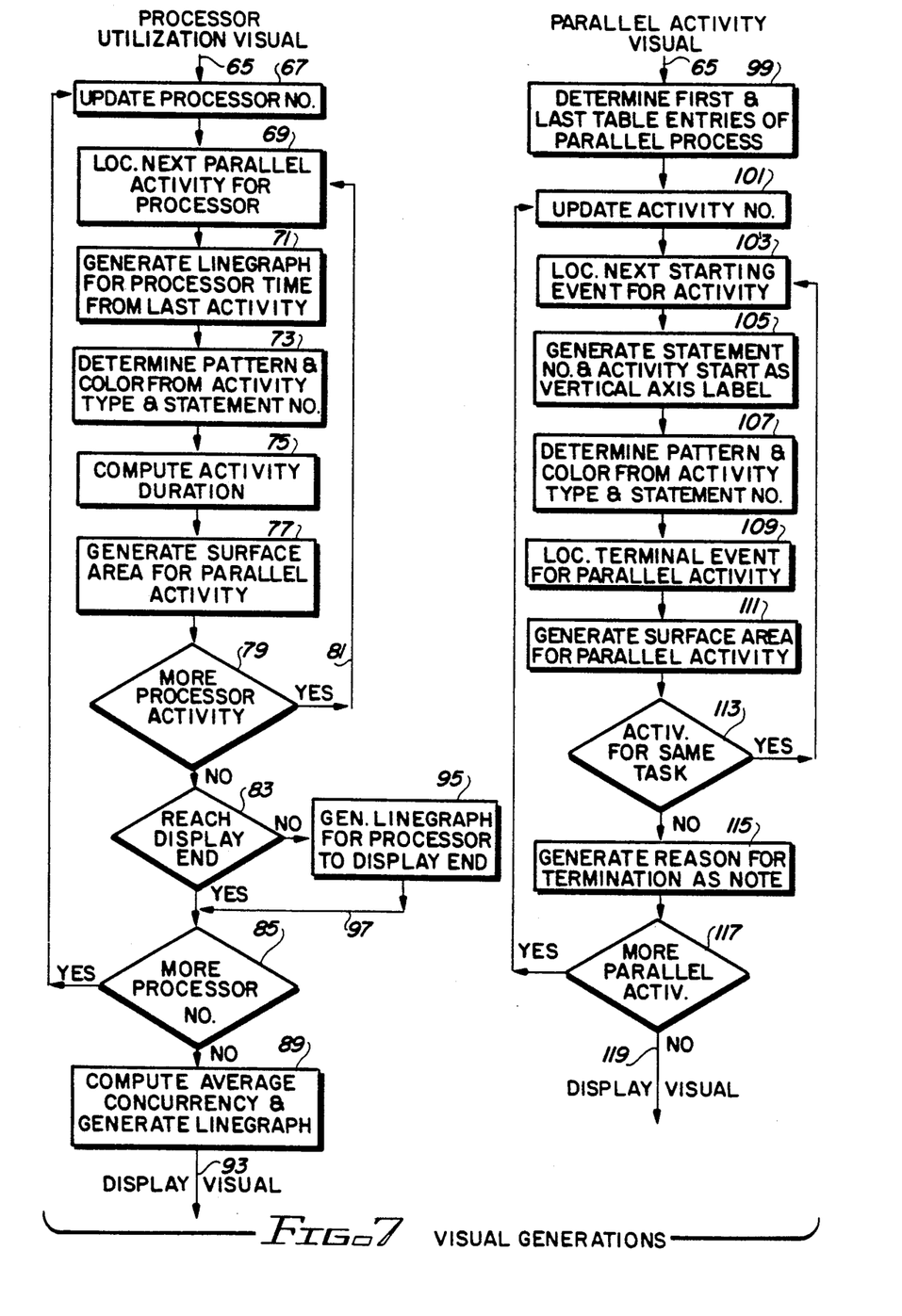
FIG. 7 sets out the flow of control for mapping the table elements onto a time process graph relating to processor utilization and degree of parallel decomposition or hierarchy according to the invention.

2. A computer implemented method for converting trace data into graphical form, said trace data being generated by operating system dispatchers representing at least one concurrent execution of tasks of a application upon one or more virtual processors, comprising the steps of:
    (a) forming a table (FIG.4/33,35; 5(a)/31') from the trace data (FIG.4/31; 5(a)/31') identifying and cross-linking a virtual processor, task ID, parallel activity, and one or more parallel activity metrics for each trace data event, said table having constitutive parts thereof termed "elements", correspondences among table elements being termed "cross links"; and
    (b) graphically mapping the table elements onto a display (1) as indexed by processor and activity cross links for processor utilization (FIG.7/67-14 93; FIG.8) and (2) as indexed by task and activity cross links for a executing hierarchy of parallel tasks (FIG.7/99-119;FIG.9).

3. The method according to claim 2, wherein steps (a) and (b) respectively include the steps of
    (a1) deriving a concordance (FIG. 4-35) of task ID and parallel activities as sorted on the task ID; and
    (b1) accessing the table by way of the concordance in the mapping table elements onto the display (FIG. 9) of executing the hierarchy of parallel tasks.

4. The method according to claim 2, wherein the step of graphically mapping the table elements onto a display includes invoking a graphics data display manager (GDDM) and causing the coloring of the display by said GDDM as indexed by selected processor, task ID, and activity.

5. The method according to claim 2, wherein the display includes a time process diagram depicting virtual processor utilization, said mapping step including processing said table once for each virtual processor ID, each time process diagram being susceptible to a zoom, forward, and backward view expressed as a time range or interval, and said mapping step further including the steps of:
 (1) expressing parallel activity in the form of primary and secondary threads, each thread having a beginning and an ending time,
 (2) comparing the beginning and end times for each primary thread to the time range of a selected view (Tmin, Tmax), and
 (3) selectively adjusting the view to conform the thread activity to the diagram time range to enhance visibility.

6. A computer implemented method for processing and displaying information about a parallel execution of an application program (FIG.2/21-23) across N virtual processors (FIG.2/15-19) as derived from trace records (FIG.4/31; 5(a)/31'), said trace records being generated by dispatching functions embedded in either the application program or operating system, comprising the steps of:
 (a) ascertaining and identifying parallel activity by scanning the trace records generated by said processors (typical events include FORK, scheduled tasks, and the like);
 (b) creating and populating a table (FIG.4/33,35; 5(b)–(c)/33') of time sequence events, said table having constitutive parts thereof termed "elements", said table being formed by any parallel activity identified in step (a), computing average concurrency, and cross-linking the elements of the table (FIG.4/34; 5(b)–(c)/34'); and
 (c) extracting data from the table as indexed by a selected sub-set of cross links (activity number and pointer) and graphically mapping data extracted from the table onto a visually perceptible medium.

* * * * *